United States Patent [19]

Firgo et al.

[11] Patent Number: 6,007,750
[45] Date of Patent: Dec. 28, 1999

[54] PROCESS FOR FORMING A CELLULOSE SPONGE

[75] Inventors: Heinrich Firgo; Siegfried Ambrosch, both of Vöcklabruck; Andreas Schweigart, St. Georgen, all of Austria

[73] Assignee: Lenzing Aktiengesellschaft, Lenzing, Austria

[21] Appl. No.: 08/918,890

[22] Filed: Aug. 8, 1997

Related U.S. Application Data

[63] Continuation of application No. PCT/AT96/00258, Dec. 19, 1996.

[30] Foreign Application Priority Data

Dec. 22, 1995 [AT] Austria .................................. 2100/95

[51] Int. Cl.⁶ .................................................. B29C 44/02
[52] U.S. Cl. ............................................ 264/54; 264/344
[58] Field of Search .................................. 264/49, 54, 344

[56] References Cited

U.S. PATENT DOCUMENTS

| | | | |
|---|---|---|---|
| 509,469 | 3/1992 | Zikeli . | |
| 1,142,619 | 6/1915 | Pum et al. ................................. | 264/49 |
| 1,909,629 | 5/1933 | Pfannenstiel et al. ..................... | 264/49 |
| 2,107,637 | 2/1938 | Lefebvre-Carnot et al. .............. | 264/49 |
| 2,329,239 | 9/1943 | Banigan .................................... | 264/49 |
| 2,512,506 | 6/1950 | Denis ........................................ | 264/49 |
| 2,836,503 | 5/1958 | Osborn ...................................... | 264/54 |
| 2,906,642 | 9/1959 | Dennis ...................................... | 264/54 |
| 2,913,769 | 11/1959 | Kastli ....................................... | 264/54 |
| 2,927,034 | 3/1960 | Chih ......................................... | 264/54 |
| 4,196,282 | 4/1980 | Franks et al. ............................. | 536/56 |
| 4,261,943 | 4/1981 | McCorsley, III ......................... | 264/136 |
| 5,409,532 | 4/1995 | Astegger . | |
| 5,690,996 | 11/1997 | Sanderson ................................. | 427/244 |

FOREIGN PATENT DOCUMENTS

| | | |
|---|---|---|
| 0356419 | 2/1990 | European Pat. Off. . |
| 0418151 | 3/1991 | European Pat. Off. . |
| 533070 | 7/1993 | European Pat. Off. . |
| 1 816 770 | 7/1969 | Germany ................................. 264/49 |
| 42-9018 | 5/1967 | Japan ....................................... 264/49 |
| 43-26098 | 11/1968 | Japan ....................................... 264/49 |
| 245049 | 12/1925 | United Kingdom ..................... 264/49 |
| 392483 | 5/1933 | United Kingdom ..................... 264/49 |
| 445456 | 4/1936 | United Kingdom ..................... 264/49 |
| 2284421 | 6/1995 | United Kingdom . |

OTHER PUBLICATIONS

Peguy: "New Materials from Cellulose or Lignocellulose Solutions in Amine Oxide"; Proceedings of the Nisshinbo International Conference in Cellulosics Utilization in Near Future, Tokyo 1988, pp. 19–24, Elsevier Applied Science.

Chemical Abstracts, vol. 117, No. 8, Aug. 24, 1992, Abstract No. 71941.

Peguy: "New Materials from Cellulose or Lignocellulose Solutions in Amine Oxide Systems", Proceedings of Nisshinbo Int. Conference on Cellulosics Utilization in the Near Future, pp. 19–24, (1988).

*Primary Examiner*—Allan R. Kuhns
*Attorney, Agent, or Firm*—Baker & Botts L.L.P.

[57] ABSTRACT

The invention is concerned with a cellulose sponge which may be produced by mixing a solution of cellulose in an aqueous tertiary amine-oxide with a pore forming agent and a sponging agent and subsequently exposing it to conditions which cause a decomposition of the sponging agent and a foaming of the cellulose solution, whereafter the foamed cellulose is contacted with water to precipitate the cellulose.

14 Claims, No Drawings

PROCESS FOR FORMING A CELLULOSE SPONGE

This application is a continuation of PCT/AT96/00258, filed Dec. 19, 1996.

The invention is concerned with a cellulose sponge and a process for its production.

BACKGROUND OF THE INVENTION

From EP-A-0 418 151 a cellulose sponge produced from viscose is known. According to this known process, wood pulp is converted into the xanthate, the xanthate is mixed with a porophore and fibres, whereafter particles of an absorbing polymer coated with a polymer layer are added. Afterwards, the xanthate is regenerated using an acid or a base, and the regenerate is washed and bleached.

A disadvantage of this process is that due to the by-products of the viscose process its environmental impact creates problems to be solved.

For some decades there has been searched for processes able to substitute the viscose process today widely employed. As an alternative which is interesting for its reduced environmental impact among other reasons, it has been found to dissolve cellulose without derivatisation in an organic solvent and extrude from this solution moulded bodies, e.g. fibres, films and other moulded bodies. Fibres thus extruded have received by BISFA (The International Bureau for the Standardization of man made fibers) the generic name Lyocell. As an organic solvent, BISFA understands a mixture of an organic chemical and water.

It has turned out that as an organic solvent, a mixture of a tertiary amine-oxide and water is particularly appropriate for the production of cellulose moulded bodies. As the amine-oxide, primarily N-methylmorpholine-N-oxide (NMMO) is used. Other amine-oxides are described e.g. in EP-A-0 553 070. A process for the production of mouldable cellulose solutions is known e.g. from EP-A-0 356 419. The production of cellulose bodies using tertiary amine-oxides generally is referred to as amine-oxide process.

In EP-A-0 356 419, a process for the production of cellulose solutions is described, wherein as a starting material among other substances a suspension of cellulose in liquid, aqueous N-methylmorpholine-N-oxide (NMMO) is used. This process consists in transforming the suspension in a thin-film treatment apparatus in one single step and continuously into a mouldable solution. Finally. the mouldable solution is spun into filaments by means of a forming tool such as a spinneret and the filaments are conducted through a precipitation bath.

The cellulose is precipitated from the solution in an aqueous spinning bath. During this process, amine-oxide accumulates in the spinning bath. The content of amine-oxide in the process waters produced amounts to up to 30% by weight. For the economy of the amine-oxide process it is of vital importance to recover and reuse the amine-oxide nearly completely.

In the literature, virtually nothing is known about the production of a cellulose sponge according to the amine-oxide process. Only in 1988 it was reported that a new process for the production of cellular cellulose, which is similar to sponges, from a solution of cellulose in an aqueous tertiary amine-oxide was searched. It is further reported that a number of parameters, whereof the water content is of foremost importance, influences the production, and that the products obtained are similar to those produced from viscose (Peguy: "New Materials from Cellulose or Lignocellulose Solutions in Amine Oxides"; Proceedings of the Nisshinbo International Conference in Cellulosics Utilization in Near Future, Tokyo 1988, pages 19–24, Elsevier Applied Science). However, a reproducible teaching for the production of sponges from the cellulose solutions cannot be deduced from this literature.

It is the object of the invention to provide a cellulose sponge which is to be produced according to the amine-oxide process.

SUMMARY OF THE INVENTION

The process according to the invention for the production of a cellulose sponge is characterized in that a solution of cellulose in an aqueous tertiary amine-oxide is mixed with a pore forming agent and a sponging agent and subsequently exposed to conditions which cause a decomposition of the sponging agent and a foaming of the cellulose solution, whereafter the foamed cellulose is contacted with water to precipitate the cellulose. Afterwards, the tertiary amine-oxide is washed out of the cellulose sponge obtained.

As the pore forming agent, an alkaline metal or an alkaline earth metal salt of an inorganic acid is preferably employed, sodium sulphate or magnesium sulphate showing particularly good results.

The pore forming agent is conveniently used in an amount not exceeding three time of the mass of the cellulose solution employed.

As the sponging agent preferably azodicarbonamide, which optionally may be modified, or sodium hydrocarbonate is employed. The sponging agent must be selected in such a manner that no exothermal reaction is initiated in the cellulose solution. Above all, it should not contain any metal ions capable of initiating a decomposition of the tertiary amine-oxide. As an example, the sponging agent Tracel DBN 120 NER of the company Tramaco, Germany, is cited. This sponging agent has a decomposition temperature of 115° C.

The sponging agent is suitably used in an amount being from 3% to 20% of the mass of the cellulose solution employed.

It has been shown that the content of dissolved cellulose in the cellulose solution used has an immediate influence on the foaming behaviour. The lower the cellulose content, the higher the foaming degree and the lower the adhesion of the individual pores of the finished cellulose sponge among each other. This means that the mechanical resistance declines. On the other hand, when the cellulose content is too high, foaming declines such that no pore structure can be produced. It has been shown further that of from 7 to 20% by mass of cellulose should be best contained.

It has proven particularly advantageous for the cellulose solution used to contain additionally undissolved cellulose particles such as fibres. These fibres serve as a reinforcing agent. Moreover, apart from the pore forming agent and the sponging agent, a pigment for colouring may be added to the cellulose solution.

The decomposition of the sponging agent may be carried out conveniently at elevated temperature. optionally, also reduced pressure may be applied.

It has been shown further that in the process according to the invention, N-methylmorpholine-N-oxide is of particularly good use as the tertiary amine-oxide.

Optionally, the foamed cellulose solution is contacted with water containing magnesium chloride to precipitate the dissolved cellulose and to fix the pore structure.

In the process according to the invention also alternative cellulose sources such as used fabrics, garment scraps and waste paper etc. may be employed as the cellulose.

The invention is further concerned with a cellulose sponge obtainable according to the process according to the invention. The sponge according to the invention is characterized by a high water retention capacity and a satisfactory mechanical resistance.

As documented below, it is possible according to the invention to control or adjust the mechanical resistance and the water absorption capacity of the cellulose sponges according to the invention, the influencing parameters being the cellulose concentration of the processed solution, the molecular weight of the cellulose used, the concentration of pore forming agent and the concentration of sponging agent in the mass to be foamed. The process according to the invention is not harmful to the environment, since the tertiary amine-oxide can be virtually completely recovered from the precipitation bath. The sponges according to the invention are biodegradable and may be composted, disposed of or incinerated in a simple way, no toxic emissions being produced during incineration. Since unlike conventional plastic sponges they are not produced from petrochemicals, they reduce oil consumption. The sponges according to the invention may also be produced from used materials, thus contributing to their disposal.

The cellulose sponges are particularly appropriate as bathing sponges and for cleaning purposes.

DETAILED DESCRIPTION OF THE INVENTION

By means of the following Examples the invention is explained in more detail.

General Production Procedure

Ground pulp having a polymerisation degree of from 400 to 1500 such as Alicell LV or another pulp is mixed in an aqueous NMMO solution in a kneader, heated to a temperature not exceeding 90° C., and a reduced pressure of at least 0.05 bar is applied to evaporate water and dissolve the pulp to the point that approximately 2.5% of the pulp used are present in a still undissolved, swollen state. Subsequently, the pore forming agent and the sponging agent are added to the kneader, introducing them into the mixture. The mixture obtained is kneaded for about 5 to 10 minutes at 90° C.

Foaming of the mixture is carried out in a warming cabinet under conditions whereunder the sponging agent may be decomposed while producing a gas. For the sponging agent azodicarbonamide, heating to a temperature of 130° C. within a period of time of from 10 to 20 minutes is exemplified. A reduced pressure of 60 mbar may be applied.

The foamed mass is put into a water bath wherein the cellulose is precipitated and the structure of the foamed mass is fixed, a cellulose sponge being obtained wherefrom subsequently the tertiary amine-oxide is washed out and which is dried to a residual moisture content of from 10–15%.

According to the above, general production procedure, several series of cellulose sponges were produced, for series (A) employing cellulose solutions having a varied cellulose concentration (pulp: Alicell LV, 100 g; sponging agent: Tracel DBN 120 NER, 10 g; $Na_2SO_4$ (anhydrous), 30 g);

for series (B) employing pulps having different molecular weights of the cellulose contained (pulps: 100 g; cellulose concentration: 13%; sponging agent: Tracel DBN 120 NER, 10 g; $Na_2SO_4$ (anhydrous), 30 g);

for series (C) varying the content of sodium sulphate (pulp: used fabrics; cellulose concentration: 13%, sponging agent: Tracel DBN 120 NER, 10 g); and for series (D) varying the content of sponging agent (pulp: Viscokraft LV; cellulose concentration: 13%; sponging agent: Tracel DBN 120 NER).

The cellulose sponges produced were analyzed for their water absorption capacity using the weight method. The water absorption is the quotient from the weight of the wet sponge and the dry sponge multiplied by the number 100 ($100 \times weight_{wet}/weight_{dry}$).

The results are indicated in the following Tables 1 to 4. From these results it can be seen that the water absorption capacity increases as the cellulose concentration declines, as the molecular weight of the cellulose used declines, as the concentration of pore forming agent increases and as the concentration of sponging agent (Tracel DBN 120 NER; Tramaco, DE) increases.

The mechanical resistance of all cellulose sponges produced was satisfactory.

TABLE 1

| Cellulose concentration (%) | water absorption capacity (%) |
|---|---|
| 10 | 760 |
| 13 | 530 |
| 15 | 280 |

TABLE 2

| Cellulose (molecular weight) | water absorption capacity (%) |
|---|---|
| 463 | 595 |
| 755 | 460 |
| 870 | 530 |
| 1285 | 406 |
| 1473 | 373 |

TABLE 3

| $Na_2SO_4$ (%) | water absorption capacity (%) |
|---|---|
| 30 | 515 |
| 50 | 750 |
| 70 | 835 |
| 100 | 955 |

TABLE 4

| Sponging agent (%) | water absorption capacity (%) |
|---|---|
| 3 | 465 |
| 5 | 555 |
| 7 | 650 |

We claim:

1. A process for the production of a cellulose sponge comprising the steps of:

dissolving cellulose in an aqueous tertiary amine oxide to form a solution, mixing with said solution a pore forming agent and a sponging agent, subjecting the mixture of said solution with said pore forming and sponging agents to conditions of temperature and pressure which cause decomposition of said sponging agent and foaming of said cellulose solution, and contacting the foamed cellulose solution with water to precipitate the foamed cellulose.

2. A process according to claim 1, wherein as said pore forming agent an alkaline metal or an alkaline earth metal salt of an inorganic acid is employed.

3. A process according to claim 2, wherein as said pore forming agent sodium sulphate or magnesium sulphate is employed.

4. A process according to claim 3, wherein said pore forming agent is used in an amount which does not exceed three times the mass of said cellulose solution employed.

5. A process according to claim 4, wherein said sponging agent is used in an amount being of from 3% to 20% of the mass of said cellulose solution employed.

6. A process according to claim 1, wherein said sponging agent is selected from the group consisting of azodicarbonamide, a modified azodicarbonamide and sodium hydrocarbonate.

7. A process according to claim 1, wherein a cellulose solution containing of from 7 to 20% by mass of cellulose is employed.

8. A process according to claim 7, wherein said cellulose solution contains additionally undissolved cellulose particles.

9. A process according to claim 1, wherein a pigment is mixed additionally into said cellulose solution.

10. A process according to claim 1, wherein the decomposition of said sponging agent is carried out at elevated temperature.

11. The process of claim 1 wherein the dissolving and mixing steps are carried out in a kneader, said mixing step being carried out for about 5 to 10 minutes at a temperature of 90° C.

12. A process according to claim 1 wherein as the source of cellulose, wood pulp, used fabric, garment scraps and waste paper are employed, either individually or in combinations of 2 or more.

13. A process according to one of the claim 1, wherein said tertiary amine-oxide is N-methylmorpholine-N-oxide.

14. A process according to claim 1, wherein said foamed cellulose solution is contacted with water containing magnesium chloride.

* * * * *

UNITED STATES PATENT AND TRADEMARK OFFICE
CERTIFICATE OF CORRECTION

PATENT NO. : 6,007,750

DATED : December 28, 1999

INVENTOR(S) : Firgo et al.

It is certified that error appears in the above-identified patent and that said Letters Patent is hereby corrected as shown below:

On The Cover Page,

[56] References Cited, U.S. Patent DOCUMENTS: "509,469 3/1992 Zikeli" should read --5,094,690 3/1992 Zikeli--;

[56] References Cited, OTHER PUBLICATIONS: "Peguy: etc." (second occurrence) should be deleted

[54] (Title): "PROCESS FOR FORMING A CELLULOSE SPONGE" should read -- CELLULOSE SPONGE AND PROCESS FOR ITS PRODUCTION--;

Column 5, line 13: "of" (first occurrence) should be deleted;

Column 6, line 15: "claim 1," should read --claims 1 to 11--

UNITED STATES PATENT AND TRADEMARK OFFICE
CERTIFICATE OF CORRECTION

PATENT NO. : 6,007,750
DATED : December 28, 1999
INVENTOR(S) : Firgo et al.

It is certified that error appears in the above-identified patent and that said Letters Patent is hereby corrected as shown below:

Column 1, line 2: "PROCESS FOR FORMING A CELLULOSE SPONGE" should read --CELLULOSE SPONGE AND PROCESS FOR ITS PRODUCTION--;

Column 1, line 20: "has" should read -- have--;

Column 2, line 26: "three time of" should read -- three times--;

Column 2, line 59: "optionally" should read -- Optionally --;

Signed and Sealed this

Tenth Day of April, 2001

*Attest:*

NICHOLAS P. GODICI

*Attesting Officer*   Acting Director of the United States Patent and Trademark Office